United States Patent Office 3,440,952
Patented Apr. 29, 1969

3,440,952
BREWING APPARATUS
Carl R. Merola, Monroeville, and Wesley Mamrose, Irwin, Pa., assignors to Westinghouse Electric Corporation, Pittsburgh, Pa., a corporation of Pennsylvania
Filed Dec. 29, 1967, Ser. No. 694,550
Int. Cl. A23f 1/08; A47j 31/00
U.S. Cl. 99—289                    4 Claims

ABSTRACT OF THE DISCLOSURE

A brewing cup having an upper opening and a movable planar piston for closing the opening together with means to separately introduce liquid and solid brew particles substantially simultaneously through the opening while the piston is spaced above the opening in a manner to thoroughly mix the liquid and particles as they pass into the cup and to prevent accumulation of particles around the sealing surface of the brew cup opening.

Cross references to related applications

So far as is known, this invention is not related to any pending patent applications in the United States Patent Office.

Background of the invention

Brewing devices for vending machines or the like are well known and may take a variety of forms when arranged for brewing individual cups of a liquid brew such as coffee, tea or the like. One known brewing apparatus comprises a brew cup having a screened lower opening together with an upper opening through which the liquid and brew particles are introduced together with a piston that is movable into the cup to exert brewing pressure on the mixture in the cup to be passed through the screen. It is also known to close the upper opening of the brew cup with a stopper and apply pressure to the mixture within the cup by air pressure or the like for purposes of brewing the mixture. A problem has existed with such brewing apparatus in that the brew particles tend to accumulate on the inner walls and sealing surfaces of the brew cup and thus interfere with the effective sealing relation between the cup and the piston or stopper. Also, it has now been found that a thorough mixing of the liquid and brew particles as they are passed into the brew cup provides a more effective brewing action and enables the brewing to be completed in a shorter period of time.

Prior art

Reference may be made to the following listed United States patents relating to Brewing Apparatus as typical of the prior art although none of these patents disclose the arrangement of this invention for mixing liquid and brew particles as they are passed into a brew cup.

3,292,525, Heir, Dec. 20, 1966; 3,120,440, Ross, Feb. 4, 1964; 3,086,446, Totten, Apr. 23, 1963; 2,910,928, Rota, Nov. 3, 1959; 2,205,290, Herrera, June 18, 1940.

Summary

According to the invention, a brew cup with a lower screened opening is provided with an upper open end above which is normally positioned a movable planar piston or stopper in spaced relation thereto. Means is provided to move the piston downward in sealing relation to the upper opening of the cup after the liquid and brew particles have been passed into the cup. A feature of the invention is the provision of a stationary hood above the upper planar surface of the piston through which the liquid is introduced onto the upper surface of the piston to be distributed thereby towards the inner side wall and sealing surface of the brew cup. The brew cup is flared at its upper opening to surround in spaced relation the edges of the piston in its normal raised position. Means is also provided to deposit the brew particles within the upper flared side walls of the brew cup at the same time the liquid is introduced and thus a thorough mixing of water and brew particles is obtained in a manner to prevent accumulation of solid brew particles on the sealing surface of the brew cup. In a preferred embodiment, the upper planar surface of the piston is downwardly sloped towards the side edges thereof to further minimize splashing of the liquid and obtain more effective mixing action. Also, it may be preferred to position the liquid introducing means to one side of the center of the splash hood in order to obtain a tangential motion for the liquid as it strikes the upper planar surface of the piston.

Description of the preferred embodiment

Figure 1:
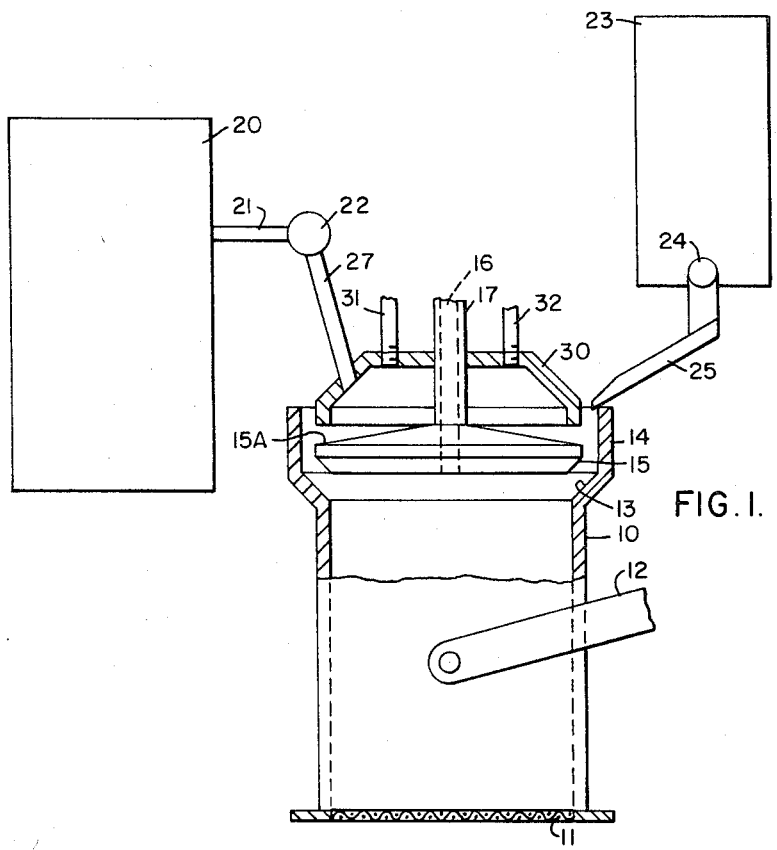
FIGURE 1 is a diagrammatic front elevational view partly in section of the brew cup apparatus of the invention with the piston shown in its normal upper raised position.
Figure 2:
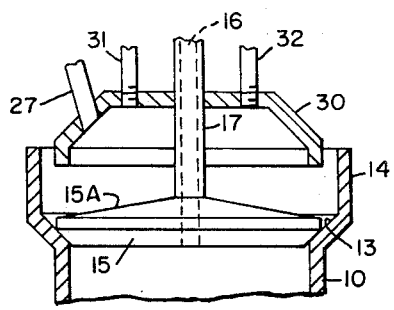
FIGURE 2 is a fragmentary view of the upper portion of the brew cup as shown by FIGURE 1 of the drawings but with the piston in the lower sealing position after the liquid and brew particles have been passed into the brew cup.

Referring to the drawing, the brew cup 10 is shown to be closed at its lower end by means of a filter or brewing screen 11 through which the liquid brew is to be forced with a separation of the liquid brew from the brewing particles within the cup 10. Either the brew cup 10 may be raised above the screen 11 by the arm 12 at the conclusion of each brewing operation in order to remove the spent grounds from the upper surface of the screen 11, or the screen 11 may be moved away from the bottom of the brew cup 10 in order to dump the grounds into a suitable container. The details concerning such movements of the brew cup or screen 10, 11 are not shown since they are not necessary for an understanding of the present invention and may in fact take many different forms.

The upper end of the brew cup 10 is flared to provide an inclined sealing surface 13 and upwardly extending flared wall surfaces 14. Positioned within the flared walls 14 at the open upper end of the brew cup 10 is a movable planar piston or stopper 15 which is shown in its normal position by FIGURE 1 of the drawings to be spaced above the sealing surface 13 of the brew cup 10. Thus while the piston or stopper 15 is spaced above the sealing surface 13 of the brew cup 10, liquid and brew particles may be separately introduced at about the same time into the cup around the peripheral edges of the piston 15. In the embodiment of the invention now being described, the member 15 is actually a stopper adapted to seal against the sealing surfaces 13 of the brew cup 10 so that compressed air may be passed through the bore 16 of the piston shaft 17 into the brew cup 10 to force the mixture of liquid and brewing particles contained therein through the brewing filter screen 11. However this invention as will be apparent upon further description may be used with the type of brewing apparatus in which the piston 15 actually moves in sealing relation along the inner wall and sealing surface 17 of the brew cup 10 to force the brewing mixture through the brew screen 11 without introduction of compressed air through the bore 16.

A hot water tank or container for other types of brew liquids is shown at 20 and is arranged to discharge brew liquid through the conduit 21 and valve 22 to the brew cup 10 before each brewing operation. A hopper 23 cantaining a conventional rotatable feed auger 24 is provided to deliver brewing particles through the chute 25 to the brew cup 10 at the same time that brewing liquid is discharged into the brew cup before the brewing of the desired brew. Timing control means for the valve 22 and auger 24 as is conventional may be provided and since many well known control schemes may be used, none is shown or described herein.

According to the invention a stationary splash hood 30 which may be supported by bolts 31 and 32 to the cylinder framework (not shown) for the piston 15 and piston shaft 17 is provided in spaced relation above the upper planar surface of the piston 15. It will be noted that the hood 30 is shaped to substantially cover the upper planar surface of the piston 15. The brew liquid passing from the valve 22 through the conduit 27 is introduced through the wall of the splash hood 30 and deposited on the upper planar surface 15A of the piston 15. It will be noted that the flared wall 14 at the upper open end of the brew cup 10 extends above the upper planar surface 15A of the piston 15 in its normal position so that water striking on the upper surface 15A of the piston 15 will be distributed against the inner walls of the flared surfaces 14 of the cup and downwardly into the brew cup 10. At the same time the brew particles passing from the chute 25 down the inner walls of the flared surface 14 of the brew cup will be thoroughly mixed with the water or other brew liquid before passing over the sealing surfaces 13 into the brew cup 10. This thorough mixing action assures that brew particles will not accumulate on the sealing surface 13 or the inner walls 17 of the brew cup 10 and also provides a thorough mixing of liquid and brew particles at the beginning of the brew cycle so as to shorten the time required for the brewing operation.

In the preferred embodiment of the invention, the liquid introducing tube 27 is positioned to extend through the splash hood 30 to one side of the center thereof as shown so as to impart a tangential movement to the brew liquid as it strikes the upper surface 15A of the piston 15. Also it will be noted that in the preferred embodiment of the invention the upper planar surface 15A of the piston 15 is inclined downwardly towards the outer edges thereof and this is found to be of advantage in minimizing splashing of the liquid while at the same time a forceful mixing action takes place.

Various modifications of the invention will occur to those skilled in the art. For example, although the piston or cup 15, 10 are preferably circular and cylindrical respectively, obviously other shapes may be used so long as the piston is complementary to the cup.

The piston or stopper 15 has been referred to as a piston but it should be understood that such term is being used in a generic sense to include a planar stopper as well as a planar piston. It should also be understood that the invention is not to be limited to any particular shape of brew cup or piston since so long as they are complementary in form various shapes such as square, rectangular, circular or the like may be used.

We claim:

1. Brewing apparatus comprising, a brew cup having an upper opening and a sealing surface thereabout through which solid particles and a liquid are passed into the cup for brewing, a planar piston for said opening normally positioned to be spaced above the opening and movable downward to a closed position for engaging the sealing surface of the opening during brewing after the solid particles and liquid have been passed into the cup, a stationary splash hood positioned above said piston and shaped to substantially cover the upper planar surface of said piston, the upper edge wall of said cup being flared to surround in spaced relation the edge of said piston in its normal position with the wall edge of the cup above the upper planar surface of the piston, means to introduce the liquid through the wall of said hood onto the upper planar surface of the piston to be distributed thereby around the sealing surface of said cup, and means to introduce the solid particles into said cup within the upper edge wall thereof above the piston in its normal position while said liquid is being introduced.

2. The invention of claim 1 in which the upper planar surface of said piston is sloped downwardly towards the edges thereof.

3. The invention of claim 1 in which the liquid introducing means is positioned to one side of the center of said hood.

4. The invention of claim 2 in which the liquid introducing means is positioned to one side of the center of said hood.

References Cited

UNITED STATES PATENTS

| 2,205,290 | 6/1940 | Herrera | 210—416 X |
| 2,907,266 | 10/1959 | Moulden | 99—289 |
| 2,910,928 | 11/1959 | Rota | 99—281 X |
| 3,086,446 | 4/1963 | Totten | 99—289 X |
| 3,120,440 | 2/1964 | Ross | 99—71 |
| 3,292,526 | 12/1966 | Heier | 99—289 |
| 3,349,690 | 10/1967 | Heier | 99—289 X |

ROBERT W. JENKINS, *Primary Examiner*

U.S. Cl. X.R.

99—71